(12) United States Patent
Hartmann et al.

(10) Patent No.: US 8,386,069 B2
(45) Date of Patent: Feb. 26, 2013

(54) METHOD OF SYNCHRONIZING A PICKUP OF A HANDLING DEVICE, A COMPUTER READABLE MEDIUM AND A CONTROL DEVICE

(75) Inventors: Guido Hartmann, Leverkusen (DE); Tino Heber, Freiberg (DE); Andre Heydenreich, Zwickau (DE); Holger Hüfner, Bautzen (DE); Raimund Kram, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 830 days.

(21) Appl. No.: 12/498,570

(22) Filed: Jul. 7, 2009

(65) Prior Publication Data

US 2010/0008754 A1 Jan. 14, 2010

(30) Foreign Application Priority Data

Jul. 8, 2008 (EP) ..................................... 08012313

(51) Int. Cl.
*B65G 47/74* (2006.01)

(52) U.S. Cl. .................... 700/213; 318/34; 318/568.13; 318/568.14; 318/568.18; 318/568.2; 700/187; 700/189; 700/190; 700/63

(58) Field of Classification Search .................. 700/213, 700/228, 229, 230
See application file for complete search history.

(56) References Cited

U.S. PATENT DOCUMENTS

| | | | |
|---|---|---|---|
| 3,283,918 A | 11/1966 | Devol | |
| 3,958,682 A * | 5/1976 | Martin | 198/341.05 |
| 4,086,522 A * | 4/1978 | Engelberger et al. | 318/568.13 |
| 4,187,454 A * | 2/1980 | Ito et al. | 318/568.14 |
| 4,486,843 A * | 12/1984 | Spongh et al. | 700/257 |
| 4,663,726 A | 5/1987 | Chand et al. | |
| 4,704,687 A * | 11/1987 | Kishi et al. | 700/190 |
| 4,772,831 A | 9/1988 | Casler, Jr. et al. | |
| 4,786,847 A * | 11/1988 | Daggett et al. | 318/568.2 |
| 4,950,128 A * | 8/1990 | Sala | 414/796.9 |
| 5,285,394 A * | 2/1994 | Montalcini et al. | 700/189 |
| 6,922,606 B1* | 7/2005 | Yutkowitz | 700/187 |
| 7,343,660 B1* | 3/2008 | Lemelson | 29/563 |
| 2005/0071021 A1* | 3/2005 | Weinhofer | 700/63 |
| 2007/0030271 A1 | 2/2007 | Kamiya | |
| 2007/0046677 A1* | 3/2007 | Hong et al. | 345/442 |
| 2008/0027580 A1* | 1/2008 | Zhang et al. | 700/245 |

FOREIGN PATENT DOCUMENTS

| | | |
|---|---|---|
| EP | 1 935 788 A1 | 6/2008 |
| JP | 2006-347754 A | 12/2006 |

* cited by examiner

*Primary Examiner* — Gene Crawford
*Assistant Examiner* — Kyle Logan

(57) ABSTRACT

A method of synchronizing a pickup of a handling device, a computer readable medium and a control device are disclosed. During movement, a pickup of a multi-axis handling device is synchronized with an object to be picked up which is carried along by a conveyor device. Furthermore, the pickup is synchronized with a moving conveyor device in order to put the object down onto the conveyor device. The pickup is synchronized along a computationally-determined polynomial path of at least the $3^{rd}$ order between a starting point and a destination point.

14 Claims, 4 Drawing Sheets

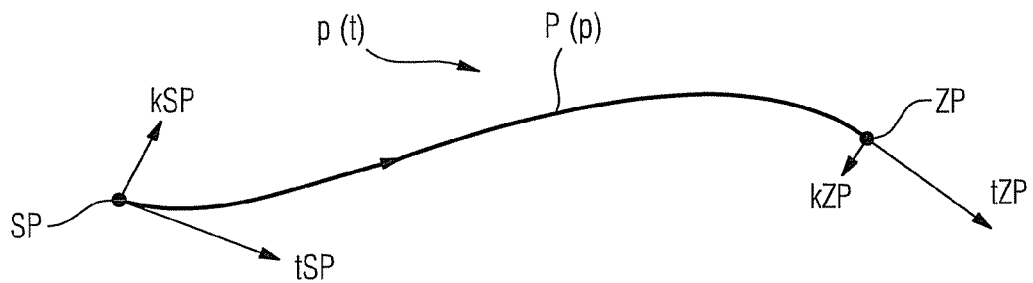
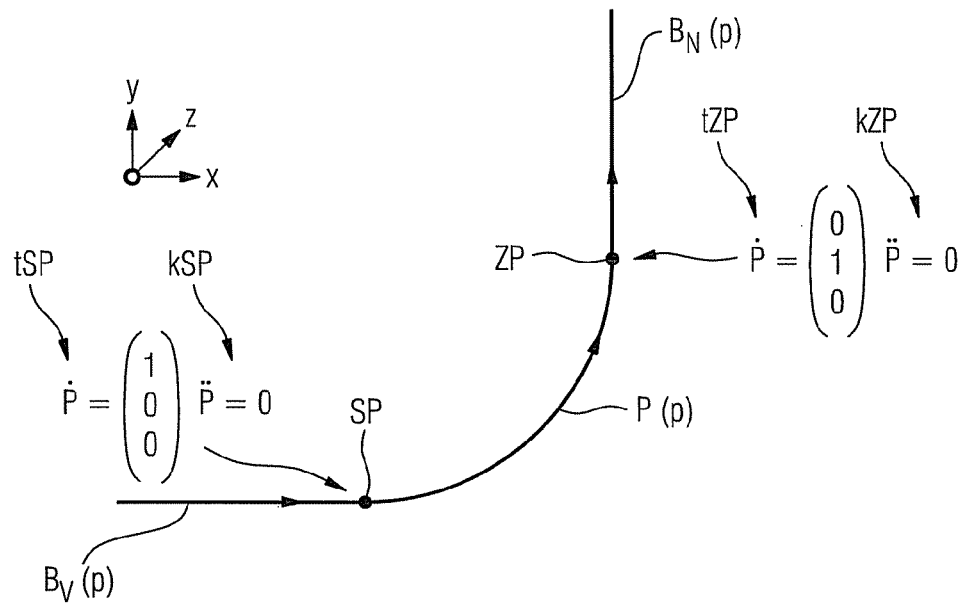

METHOD OF SYNCHRONIZING A PICKUP OF A HANDLING DEVICE, A COMPUTER READABLE MEDIUM AND A CONTROL DEVICE

CROSS REFERENCE TO RELATED APPLICATIONS

This application claims priority of European Patent Application No. 08012313.6 EP filed Jul. 8, 2008, which is incorporated by reference herein in its entirety.

FIELD OF INVENTION

The invention relates to a method of synchronizing a pickup of a multi-axis handling device especially with an object to be picked up which is carried along by a conveyor device and/or for synchronizing the pickup with a moving conveyor device in order to put an object already picked up down onto said device.

The invention further relates to the application of this type of method for synchronizing picking up of objects which are carried along by a conveyor device, and/or to synchronized putting down onto a conveyor device of objects already picked up. The invention also relates to the application of such a method to packing of packaged objects by means of a multi-axis packing machine, especially by means of a picker.

Furthermore the invention relates to a data storage medium with a path-synchronization program module stored in machine-readable form for executing such a method on at least one control device for controlling a respective pickup of at least one multi-axis handling device.

In addition the invention relates to a control device for controlling a pickup of a least one multi-axis handling device, with the respective pickup being provided for picking up objects which are carried along by at least one conveyor device, and/or for putting down objects already picked up, which are to be put down onto the at least one conveyor device. Such a control device is connected to a drive of the respective handling device for output of setting coordinates for the respective pickup. The control device is equipped with means for detecting travel and speed of the respective conveyor device or of the respective objects carried on it. In addition the control device features a processor-controlled control unit for executing at least one path synchronization program module for executing such a method. Preferably the control device is a machine controller with motion control functionality, with the controller transferring the setting coordinates for moving the machine axes to the drive for electrical control of corresponding actors of the handling device such as motors for example. The activation can alternately or additionally be undertaken using pneumatic or hydraulic means.

The invention further relates to a multi-axis handling device with such a control device for controlling the pickup of the handling device as well as to a network of at least one multi-axis handling device and at least one such control device for controlling the pickup of the respective multi-axis handling device.

BACKGROUND OF INVENTION

The above-mentioned handling devices in particular involve robots, i.e. universally-applicable automatic movement devices with a number of axes. The movements of the machine axes are freely programmable in respect of the movement sequence and sensor guided where necessary. The axes involved can be translational and/or rotational axes. The handling devices considered are able to be equipped with pickups for picking up and putting down objects or for picking up tools, processing tools or other production means. They can perform handling, manufacturing and/or operating tasks. Depending on the equipping of the handling device, movements can be undertaken in one surface, such as in a cylindrical surface for example, or within a three-dimensional working space. Further known handling devices are so-called pickers, such as delta pickers operating in two or three dimensions for example. Such pickers are preferably used for packing packaged objects such as confectionery, bread, cakes and pastries, writing articles, medical products and the like.

The conveyor devices involved are for example driven conveyor belts, roller tracks, turntables and the like. These types of conveyor device are also referred to by the generic term conveyor, they are typically driven at a constant speed, e.g. by means of a standard motor. They can also be equipped with linear encoders, such as with a rotary linear encoder for example. On the basis of the encoder signals detected the respective position and/or speed of a moving object can be derived. The determination of the respective position of the respective speed of a moving object can for example be undertaken by means of a control device which is connected for exchange of signals or data to such a linear encoder. Alternately the respective position and/or speed of the moving object are able to be detected via an optical measurement system connected to the control device. A measurement camera is aligned for optical detection of the respective objects on the conveyor device. Suitable measurement software then computationally determines the current movement position or the respective speed.

Frequently one or more handling devices operate in a network with one or more conveyor devices. To control the handling device a common control device or one control device in each case for the respective handling device can be present. The handling devices can be arranged in relation to the conveyor device such that a respective handling device can only pick up objects from and assigned conveyor device or a number of objects from a number of conveyor devices. For example a network can comprise two pickers and four conveyor devices. For example one type of confectionery will be transported on each of the four conveyor devices. The two pickers can be controlled by the control device such that a desired number of confectionery items of each type are sorted by the two pickers into the packaging provided for them. The network can also feature a further conveyor device on which in a similar manner the packaging, such as confectionery trays for example, is moved past the two pickers for filling.

It is known from the prior art that the pickup is moved along the shortest connection, meaning along a straight line, between the starting point and the computed destination point as quickly as possible. The starting point can, in accordance with the previous example, be the last position during filling of the confectionery tray with confectionery. The destination point is especially that position at which the object to be picked up will arrive taking into consideration a movement time of the pickup to be expected and taking into consideration the further transport by means of the conveyor device which will arise. After the object is picked up, the current destination point becomes the new starting point for the return movement of the pickup to the next filling position or back to a new confectionery tray to be filled. The latter form the new destination point for the pickup.

To keep the movement time as small as possible the pickup will be accelerated within the framework of the kinematical boundaries of the handling device as quickly as possible and braked shortly before reaching the destination point again as quickly as possible.

SUMMARY OF INVENTION

An object of the present invention is to specify an improved method for controlling the pickup of a handling device, through which the mechanics of the handling device are subjected to less stress.

It is a further object of the invention to specify a suitable application of the method, a suitable data storage medium and also a suitable control device for controlling the handling device.

Finally it is an object of the invention to specify a handling device with such a control device as well as a network consisting of a handling device and such a controlling device.

The object of the invention is achieved by a method as claimed in the claims. Advantageous variants of the method are specified in the dependent claims.

Furthermore, the object of the invention is achieved by a computer readable medium and a control device as claimed in the claims.

In the inventive method the pickup is synchronized especially with the object to be picked up along a computationally determined polynomial path of least the $3^{rd}$ order between a starting point and a destination point. Alternately the pickup can pick up a processing tool in order to undertake synchronized processing of an object carried along by the conveyor device, such as a semi-finished article for example. In the corresponding manner the pickup is used alternately or in addition for synchronized putting down of the object already picked up with the conveyor device along a computationally determined polynomial path of the least the $3^{rd}$ order. The computational determination of the polynomial path is preferably undertaken by means of a process-assisted control unit such as a CPU for example. The method steps required for computational determination of the polynomial path are executed by corresponding program steps of a software program.

A polynomial path of the $3^{rd}$ order for example is defined as follows:

$$P(p)=A_0p^0+A_1p^1+A_2p^2+A_3p^3 \text{ with } 0 \leq p \leq 1,$$

with p=0 being mapped out to the start of the synchronization movement, i.e. the starting point, and p=1 to the end, i.e. to the end point of the synchronization movement. P, $A_0$, $A_1$, $A_2$ and $A_3$ (in bold-type) designate three-dimensional vectors which are typically made up of three Cartesian coordinates X, Y, Z for the computational determination of a movement path running in an operating space. For the case in which a polynomial path of the pickup is provided for a movement within a surface, two-dimensional vectors are sufficient. Alternately the vectors P, $A_0$, $A_1$, $A_2$ and $A_3$ and can be made up of polar or sphere coordinates. In principle any fixed point can be used as a basis for the computational determination such as a selected stand point of the handling device to example.

In general three peripheral conditions are to be defined for resolving a $3^{rd}$-order polynomial. Since the start and destination point for the "laying through" of the polynomial path are already known or are able to be determined, two further mathematical framework conditions are to be defined. In principle a plurality of solutions for the polynomial path is computationally possible here.

In accordance with a first variant of the method the $3^{rd}$ order polynomial path is defined by the start point, the destination point and by one tangent vector respectively in the start and destination point, with the tangent vector able to be determined as a function of p from the first geometrical derivation of the polynomial path P(p). Through the definition of the start point tangent vector and the destination point tangent vector a direction of the polynomial path at the start and destination point can be predetermined in a simple manner.

The particular advantage of the inventive method is that by applying a polynomial path of at least the $3^{rd}$ order an improved path course compared to the prior art can be computed depending on the start and destination conditions. Consequently a polynomial path with framework conditions with geometry continuity in the start and destination point can consequently be used for synchronization.

A user can be spared the complex calculations which otherwise normally have to be undertaken.

In accordance with a further method variant, a polynomial path is a $5^{th}$-order polynomial path, with the polynomial path being determined by the start point, the destination point, a respective tangent vector in the start and destination point and via a respective curvature vector in the start and destination point.

A $5^{th}$-order polynomial path is defined as follows:

$$P(p)=A_0p^0+A_1p^1+A_2p^2+A_3p^3+A_4p^4+A_5p^5 \text{ with } 0 \leq p \leq 1,$$

with p=0 being mapped at the beginning of the synchronization movement, i.e. at the starting point, and p=1 at the end i.e. at the end point of the synchronization movement. P, $A_0$ through $A_5$ once more designate three-dimensional vectors which are typically made up of three Cartesian coordinates X, Y, Z as scalars. The information given above relates to the two-dimensional case and to the coordinate system used.

To resolve the $5^{th}$-order polynomial there are now six mathematical framework conditions to define, the first four framework conditions can, as described in the case of the $3^{rd}$ order, already be defined. The two last framework conditions can be defined by the fact that the polynomial path additionally has continuity of curvature in its course between the starting and the destination point. Continuity of curvature means that the change of the tangents along the polynomial path occurs with continuity in the sense of a local curve. The curvature vectors are able to be determined as a function of p directly from the second geometrical derivation of the polynomial path P(p).

The particular advantage is that a polynomial path with geometry continuity and simultaneously continuity of curvature framework conditions can be determined for synchronization in an especially simple manner.

In accordance with a further variant of the method the start point tangent vector, on synchronization of the pickup from a standstill, is allocated a direction pointing towards the destination point and the start point curvature vector is allocated a null vector. The determination of the path polynomial here is especially simple to design for this case.

In accordance with an especially advantageous variant of the method the polynomial path is followed using a constant-speed speed profile. Such a speed profile can for example have a trapezoidal shape. The travel, i.e. the conversion of the mathematical path polynomial into a time-dependent path movement, can be undertaken for example by means of a path interpolator known from motion control technology. Such a path interpolator cyclically determines on the basis of the path polynomial and the associated speed profile checkpoints lying between the start and destination point, along which the pickup is then moved with precise timing, the functionality of such a path interpolator is typically executed by running a program on the microprocessor.

This enables a pickup of the handling device to be advantageously swung with the same direction and speed, which means synchronously, into a moving object at the starting and destination point. The mechanics of the handling device by comparison with a linear transverse movement of the pickup in the prior art with disadvantageously high impact load, are significantly less stressed.

In particular the speed profile enables a speed present in the starting point and to be expected in the destination point to be constantly maintained. In other words the pickup, when following a previous path segment, on arriving at the destination point there, can be continued in the same direction and at the same speed along the newly determined path segment. In such cases the previous destination point becomes the new starting point of the path segment continued with continuity. In a corresponding manner the pickup, on arrival at the destination point, can be moved with continuity in the same direction and at a constant speed further along a subsequent and already pre-calculated path segment. In this case the current destination point becomes the new starting point of the subsequent path segment.

In accordance with a further variant of the method the speed to be continued with continuity is a conveyor speed of the object to be picked up or put down at the destination point. This means that the movement of the pickup at the destination point is synchronized in speed with the object to be picked up or put down. Typically the object has the same speed as the speed of conveyance of the associated conveyor device for carrying along or putting down the objects. This is the case of example with conveyor belts or roller tracks.

In accordance with an especially advantageous variant of the method the polynomial path is followed using an additional constant-acceleration speed profile. The same-direction, speed-synchronous and now simultaneously torque-damped pivoting of the pickup to the object at the destination point means that the mechanics of the handling device and especially those of the pickup are again subjected to significantly less stress.

According to a variant of the method an acceleration to be expected at the destination point or an acceleration already present at the starting point will be continued with continuity. In particular the acceleration to be continued with continuity is then a conveyor acceleration of the object to be picked up or put down at the destination point. This variant of the method is advantageous for conveyor devices which can have different speeds of conveyance at different conveyance positions. These types of conveyance device can for example be conveyor belts or roller tracks which have acceleration and braking areas for the object to be carried along with or picked up from the conveyors.

The at least $3^{rd}$-order polynomial path is preferably a two- or three-dimensional polynomial path in accordance with one variant of the method. Preferably the respective computationally-determined coordinates of the pickup for following the polynomial path are converted via a kinematical transformation into the respective axis coordinates of the multi-axis handling device.

The inventive method is especially advantageously applicable to synchronized picking up of objects which are carried along by a conveyor device and/or for synchronized putting down onto a conveyor device of objects already picked up. The objects involved can typically be goods, loose items, bread, cakes and pastries, stationery articles, medical products and the like.

Furthermore the inventive method can be advantageously employed for packing packaged objects by means of a multi-axis packing machine, especially by means of a picker. Especially with such packing machines the mechanical stress resulting from the long operating time and resulting from the large number of items to be packed is especially high.

Furthermore a path synchronization program module for executing the inventive method can be stored on a data storage medium in machine-readable form. The program module is able to be executed on at least one control device for controlling a respective pickup of at least one multi-axis handling device. After such a program model has been loaded into the main memory of the control and after execution of this program module, an especially machine-protective and simultaneously rapid synchronization of the pickup with the moved object or with the respective conveyor device is advantageously possible. The storage medium can be an optical data medium such as a CD-ROM, a DVD-ROM, a diskette, a flash memory card or a USB data memory for example.

The object of the invention is further achieved with a control device for controlling a pickup of a least one multi-axis handling device, with the respective pickup being provided for picking up objects which are carried along by at least one conveyor device and/or for putting down objects already picked up, which are to be put down onto the a least one conveyor device. The inventive control device is connected to a drive of the respective handling device for output of setting coordinates for the respective pickup. It is also connected to means for distance and speed detection of the respective conveyor device or of the respective objects carried along on the device. Furthermore such a control device features a processor-assisted control unit for executing a least one path synchronization program module for executing the inventive method. The control unit is preferably a CPU.

The object is further achieved by a multi-axis handling device which in a corresponding manner features a pickup for picking up objects and/or for putting down objects already picked up. The handling device also features such a control device for controlling the pickup of the handling device. The handling device can also feature a drive control into which the controller is preferably integrated. Such a handling device can be a multi-axis robot, and automatic device or a picker.

Finally, to achieve the object for the network, a least one multi-axis handling device with a pickup in each case for picking up objects and/or for putting down objects which have already been picked up and at least one such control device for controlling the pickup of the respective multi-axis handling device are provided. Such a control device can for example feature a number of control units for executing a respective path synchronization program module for the relevant handling device. The control device can also feature just one single control unit on which a path synchronization program module for each handling device is simultaneously executed in each case.

BRIEF DESCRIPTION OF THE DRAWINGS

The invention, as well as advantageous embodiments of the invention, are described in more detail below on the basis of the following figures. The figures show FIG. 1 an example of a polynomial path which is followed using a speed profile, FIG. 2 an example of a polynomial path which continues a previous polynomial path tangentially and with continuity of curvature and which joins onto a subsequent polynomial path tangentially and with continuity of curvature, FIG. 3 an example of a sequence of program steps S0-S7 of a path synchronization program module for executing the method, FIG. 4 an example of a network comprising a handling device with a pickup at the start of a synchronization and a control device, FIG. 5 the example as depicted in FIG. 4, with the pickup at the end of the synchronization for picking up an object and FIG. 6 a further example of a network.

DETAILED DESCRIPTION OF INVENTION

FIG. 1 shows a typical example of a polynomial path P(p), which is followed using a speed profile p(t). The arrow entered in the diagram shows the course of the path when the polynomial path P(p) is being followed. Entered in the left-hand part of FIG. 1 is a starting point SP of the polynomial path P(p) with a starting point tangent vector tSP and a starting point curvature vector kSP. Entered in the right-hand part of FIG. 1 are the corresponding destination point ZP, destination point tangent vector tZP and destination point curvature vector kZP. The typical $5^{th}$-order path polynomial P(p) is able to be determined via these six framework conditions SP, ZP, tSP, tZP, kSP, kZP.

FIG. 2 shows an example of a polynomial path P(p) which continues a previous path $B_V(p)$ tangentially and with constant curvature and joins onto a subsequent path $B_N(P)$ tangentially and with constant curvature. The previous and subsequent path $B_V(p)$, $B_N(P)$ can for example be a linear path, a circular path, a further polynomial path or any other path. The polynomial path P(p) shown once again involves a $5^{th}$-order polynomial path P(p) with starting and destination point SP, ZP. X, Y, Z designate the axes of the typically Cartesian reference system. The two points SP, ZP have three-dimensional Cartesian coordinates not identified any further (X, Y, Z). The associated tangent vectors tSP, tZP have the Cartesian coordinates (1,0,0) and also (0,1,0). They are in the same direction as the previous and subsequent path $B_V(P)$, $B_N(P)$ joining onto the polynomial path P(p). The two tangent vectors (tSP, tZP) are able to be derived in this case directly from the first geometrical derivation of the polynomial path P(p), symbolized by a dot above the P of P(p). The associated curvature vectors kSP, kZP correspond to the null vector, meaning that the second geometrical derivation of the polynomial path P(p) in the starting point and destination point SP, ZP, symbolized by two dots above the P of P(p).

Figure 3:
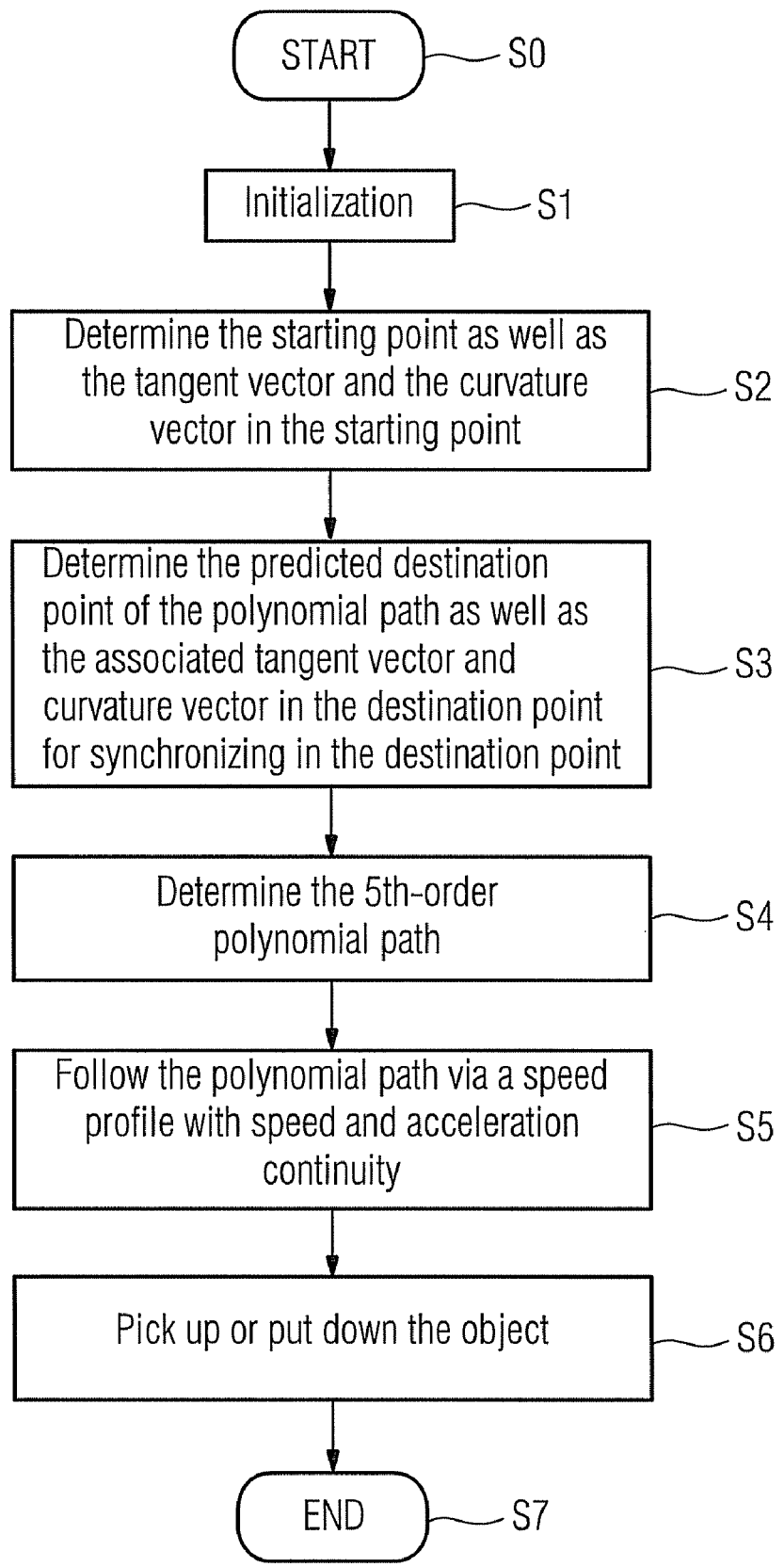

FIG. 3 shows an example of a sequence of program steps S0-S7 of a path optimization program module for carrying out the synchronization method. Such a path optimization program model is preferably executed on a processor of a control device provided for controlling a handling device. In the method a pickup of the handling device is synchronized with an object to be picked up which is carried along by a conveyor device and/or with a moving conveyor device onto which if necessarily an object already picked up is to be put down. The pickup in this case is synchronized along a computationally-determined at least $3^{rd}$-order polynomial path between a starting point and a destination point. In the example given here the polynomial path has a $5^{th}$ order.

S0 designates the start of the path optimization program module. Subsequently, in step S1 and initialization of the control device is undertaken. This can for example include a function test of the entire controller for the handling device to be controlled.

In the subsequent step S2 the coordinates of the starting point for the pickup to be controlled as well as the associated tangent vector and curvature vector are determined. The multi-dimensional coordinates of the starting point can for example be determined directly from the current available spatial position of the pickup.

In S3 the predicted destination point of the polynomial path is determined as well as the associated tangent and curvature vector in the destination point. In the event of a synchronization of the pickup being undertaken from standstill, the starting point tangent vector is preferably allocated a direction pointing towards the destination point and the starting point curvature vector is allocated a null vector.

The corresponding coordinates of the destination point can be determined for example from the current position of the object to be detected, with the movement track of the object by means of a conveyor device being taken into account computationally. This can be done on the basis of a known, typically constant conveyor speed and on the basis of a predictable or interpolatable movement time of the pickup from the starting point to the destination point. Under some circumstances average movement time and consequently an average movement distance of the object can be used as a starting point for movement sequences which are approximately the same.

Subsequently in step S4 the 5th-order polynomial path is calculated which is tangentially constant in the starting and destination point determined and at the same time has continuity of curvature over the course of the entire polynomial.

In step S5 the polynomial track is followed over a constant-speed and at the same time constant-acceleration speed profile. It is important that the following of the polynomial path occurs with torque limiting here. The speed profile can for example exhibit a trapezoidal or cubic shape. In particular the speed and acceleration present in the starting point and expected at the destination point are continued at a constant rate by the speed profile. The latter are preferably a speed of conveyance of the object to be picked up or put down at the destination point. In this case the respective coordinates of the pickup of the multi-axis handling device determined computationally for following of the polynomial path are converted via a kinematical transformation into the respective axis coordinates of the multi-axis handling device.

In step S6, after the destination position is reached, the picking up or putting down of the object to be synchronized is undertaken.

The end of the program is labeled S7.

The method described above able to be implemented by means of the path synchronization program module can advantageously be used for synchronized picking up of objects which are being carried along by a conveyor device, and/or for synchronized putting down onto a conveyor device of objects already picked up. Furthermore the method can be used especially advantageously for packing the packaged objects by means of a multi-axis packing machine, especially by means of a picker. The associated path synchronization program module can be stored in machine-readable form on a data storage medium, such as a DVD or a flash memory card for example. For this purpose the path synchronization program module holds the necessary program steps S0-S7 for controlling the handling device on a control unit of the control device.

Figure 4:
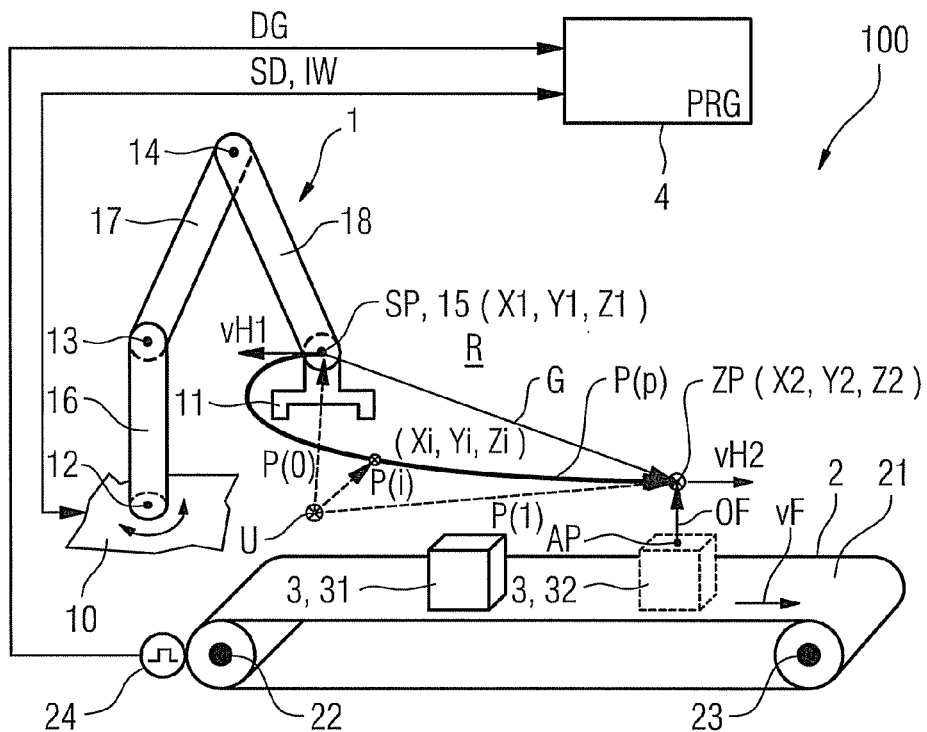

FIG. 4 shows an example of a network 100 comprising a handling device 1 with a pickup 11 at the start of a synchronization and a control device 4. In the example shown in FIG. 4 the network 100 additionally features a conveyor device 2.

Shown in the central part of FIG. 4 is a multi-axis handling device 1 with a pick up 11 for picking up objects 3. The object 3 typically involves a cube-shaped package. The handling device 1 or the robot shown as for rotary axes 12-15 with rotor arms 16-18 lying between them. The reference number 10 identifies a fixed base of the robot 1 and the number 11 the pickup or gripper for picking up and putting down the objects 3. The arrangement of the axes 12-15 allows a three-dimensional movement of the pickup 11 in a working space R. Furthermore the pickup 11 can be pivoted around the axis 15, in order to be able to pick up or put down the object 3 in the correct position. KEP designates a so-called kinematical end point which forms the spatial end point for the computational path calculation. The corresponding offset vector OF depending on the dimensions of the pickup 11 is used for computational correction of a kinematical end point KEP at a selected pickup point AP of the object 3.

Shown in the lower part of FIG. 4 is a conveyor device 2 in the form of a belt for moving the objects 3 to be picked up past the pickup. The moving belt 2 features a conveyor belt 21 which is preferably driven at a constant speed vF over two rollers 22, 23. Only one of the two rollers 22, 23 can also be driven. A rotary sensor 24 on one of the rulers 22 is used for detecting movement pulses 24.

Shown in the upper part of FIG. 4 is a control device 4 which features a processor-assisted control unit not shown in any greater detail for performing tasks such as executing a path synchronization program module. The path synchronization program module comprises program steps for executing the method for synchronizing the pickup 11 with the objects 3 to be picked up shown in the example along the entered polynomial path P(p).

The control device 4 is connected for carrying out the method to a drive of the handling device 1 not shown in greater detail for output of setting coordinates SD for the pickup 11. In the reverse direction the control device 4 receives current coordinate actual values IW for controlling the pickup 11. In the example depicted in FIG. 4, the control device 4 is connected to the linear encoder 24 for detecting the movement of the conveyed object 3. On the basis of the detected movement pulses the actual position of the object 3 can be determined.

In the example depicted in FIG. 4 the pickup 11 of the handling device 1 is at its starting point SP. In accordance with the specification provided by the control device 4 for picking up an object 3, the pickup 11 is now guided at the start of the synchronization along the polynomial path P(p) shown. In the figure the reference number 31 shows the object 3 to be picked up at the start of the synchronization and the number 32 shows the object at the end of the synchronization. SP designates the starting point of the pickup 11—here in relation to the kinematical end point KEP. The associated three-dimensional Cartesian starting point coordinates X1, Y1, Z1 are in parentheses. ZP designates the destination point of the pickup 11 to which the kinematical end point KEP is to be moved, in order to then pick up the object 3, 32 there. The associated three-dimensional, Cartesian destination point coordinates X2, Y2, Z2 are in their turn placed in parentheses. Furthermore the letter G is used to indicate the shortest path, i.e. a straight line, along which the pickup 11 would be moved in accordance with the prior art.

The pickup 11 with an object 3-32 to be picked up, which is carried along by the conveyor device 2, is synchronized, with the pickup 11 being synchronized along the computationally determined at least $3^{rd}$-order polynomial path P(p) between a starting point SP and a destination point ZP. In the example depicted in FIG. 4 the polynomial path P(p) has a $5^{th}$ order, in which case for reasons of clarity for the present example the associated tangent and curvature vectors in the starting and the destination point SP, ZP are not entered in the diagram. Instead the speed vectors vH1, vH2 resulting from following the polynomial path P(p) via the speed profile p(t) are entered in the starting and destination point SP, ZP.

P(0) is entered to indicate a local vector of the polynomial path P(p) which points to the beginning of the synchronization. P(1) is entered to indicate a local vector which points to the end of the synchronization. Entered to represent intermediate checkpoints for following the polynomial path P(p) is a further local vector P(i) with the coordinates Xi, Yi, Zi. U designates a fixed location origin for the coordinate system used as a basis here.

To calculate the $5^{th}$-order path polynomial P(p) the framework conditions described at the start must be fulfilled, meaning that the starting point and destination point SP, ZP as well as the respective tangent and curvature vectors must be determined. The resulting polynomial path P(p) then has tangential continuity and continuity of curvature at the starting point and destination point SP, ZP. This is intended to illustrate the gentle forced course of the polynomial path P(p). If this polynomial path P(p) is followed at a constant-speed and simultaneously constant-acceleration speed profile, the pickup 11 of the handling device 1 can be swung in a softly in the same direction and with torque limiting from the starting point SP into the destination point to pick up the object 3. It is important for the speed profile p(t) as a function of the time t, that this is torque limited, this means that the accelerations occurring on following the polynomial path (p) at least for a section of the polynomial path P(p) and for the remaining path sections are subject to the restricted acceleration value.

In the present example the pickup 11 is still moving at the starting point SP, illustrated by the speed vector vH1 at the starting point SP. Such a situation exists for example when goods transported from a previous "transport task" have been synchronized for offloading with another conveyor device 2. As FIG. 4 shows, the pickup 11 first moves on the path to the destination point 11 a little further in the previous direction and then softly and with backwards limitation to the destination point ZP in the direction of the indicated speed vector vH2. In this case the speed vector vH2 in the destination point ZP essentially matches the speed vector vF of the object 3 to be picked up and consequently matches the speed of conveyance vF of the conveyor device 2.

Figure 5:
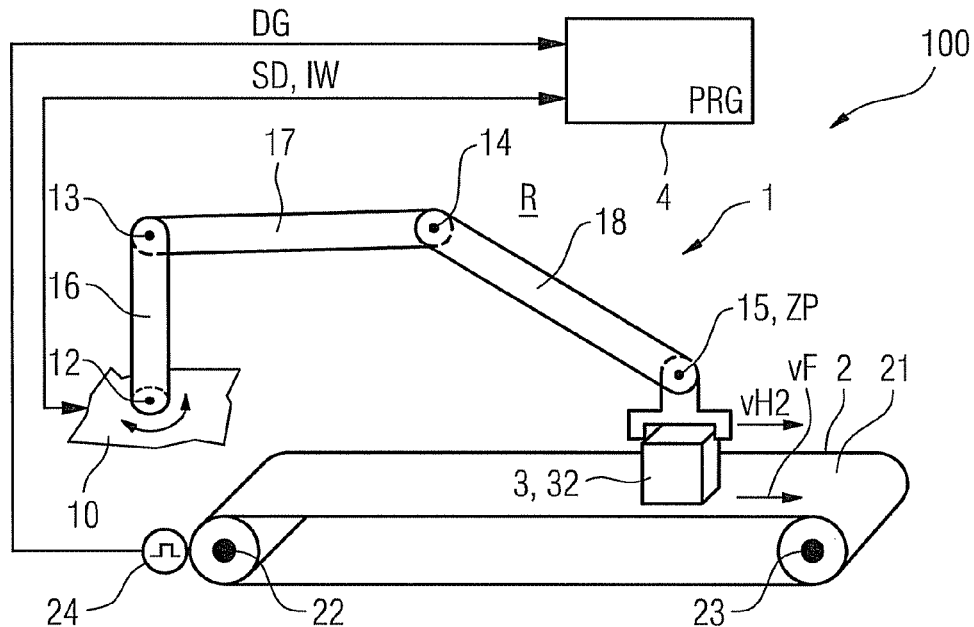

FIG. 5 shows the example depicted in FIG. 4 with the pickup 11 at the end of a synchronization for picking up an object 3.

The moved pickup 11 now picks up the object 3 to be picked up. In doing so the pickup 11 moves in the same direction and at the same speed, i.e. synchronously, with the object 3. To pick up the object 3 the handling device 1 receives a corresponding control command in order to activate the closure of gripper tools of the pickup 11 not shown in any greater detail in the diagram.

Figure 6:
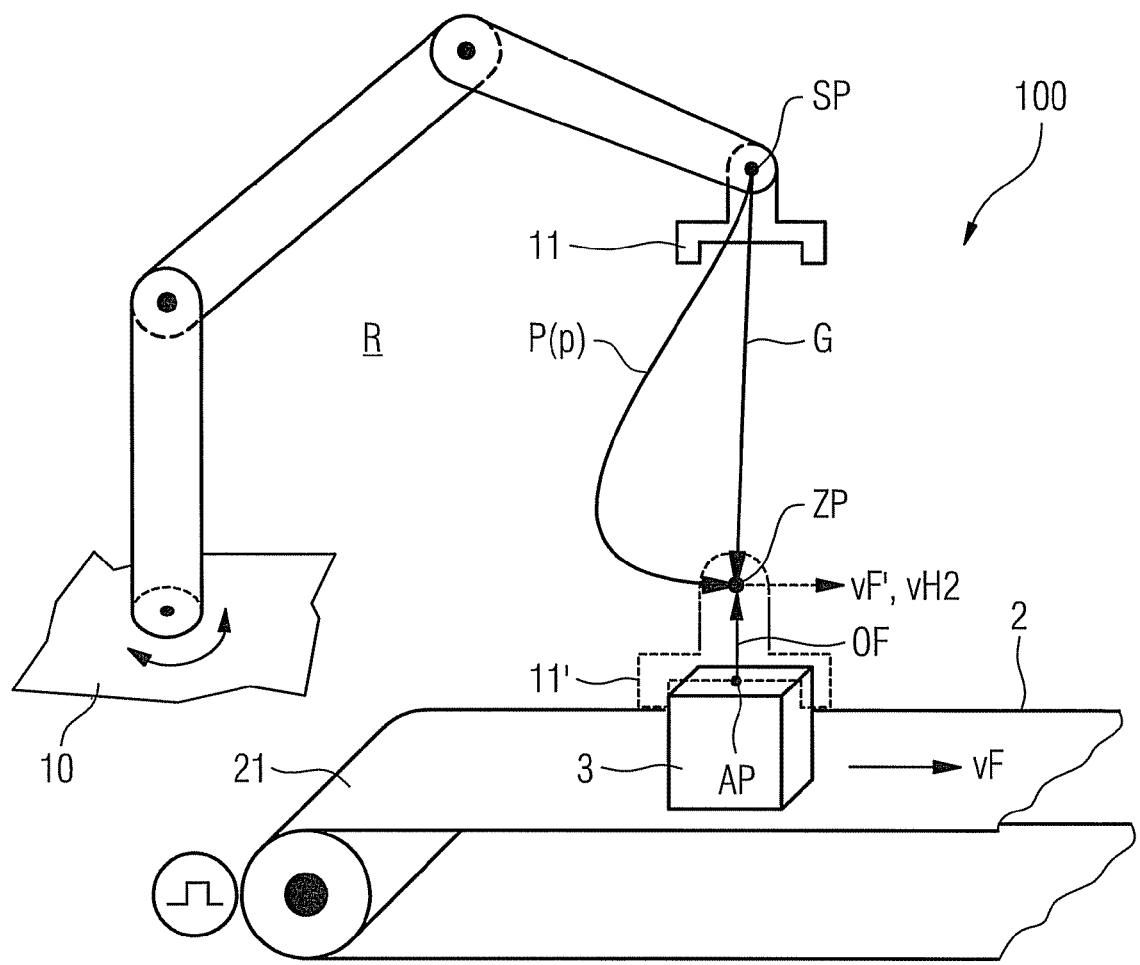

FIG. 6 shows a further example of a network 100. For better understanding of the method the starting point and destination point SP, ZP of the pickup 11 are now shown jointly in FIG. 6. In this enlarged diagram the synchronization in the same direction and at the same speed of the pickup 11 with the object 3 to be picked up at the destination point ZP can be seen particularly well. At the same time the synchronization with continuity of acceleration occurs with the object 3 to be picked up. 11' shows the end position of the pickup 11 at the end of the synchronization. The speed vector vF' is intended to illustrate that the speed vH2 of the pickup 11' at the destination point ZP matches the speed of conveyance vF. The straight-line movement path G usual with the prior art is entered in the diagram for comparison.

The invention claimed is:

1. A method for synchronizing a pickup of a multi-axis handling device, comprising:
   providing a pickup of a multi-axis handling device and a conveyor device;
   synchronizing the pickup along a computationally-determined polynomial path of at least a 3rd order between a starting point and a destination point, wherein the polynomial path is a polynomial path of the 5th order;
   moving the conveyor device;
   picking up an object and carrying along the object by the conveyor device and/or
   putting the object down onto the conveyor device,
   defining the polynomial path via the starting point, the destination point, via a respective tangent vector in the starting and destination point and via a respective curvature vector in the starting and destination point;
   allocating a direction pointing to the destination point to the starting point tangent vector during the synchronization of the pickup from a standstill; and
   allocating a null vector to the starting point curvature vector.

2. The method as claimed in claim 1, further comprising:
   following the polynomial path via a speed profile with speed continuity.

3. The method as claimed in claim 2, further comprising:
   continuing a speed present in the starting point and to be expected in the destination point with continuity by the speed profile.

4. The method as claimed in claim 3, wherein the speed to be continued with continuity is a speed of conveyance of the object to be picked up or put down in the destination point.

5. The method as claimed in claim 1, further comprising:
   following the polynomial path via an additional speed profile with continuity of acceleration.

6. The method as claimed in claim 5, further comprising:
   continuing an acceleration present at the starting point and to be expected at the destination point with continuity by the speed profile.

7. The method as claimed in claim 6, wherein the acceleration to be continued at a constant rate is a conveyance acceleration of the object to be picked up or put down at the destination point.

8. The method as claimed in claim 1, wherein the polynomial path is a two- or three-dimensional polynomial path.

9. The method as claimed in claim 2, further comprising:
   transforming coordinates of the pickup of the multi-axis handling device determined computationally for following the polynomial path via a kinematical transformation into the respective axis coordinates of the multi-axis handling device.

10. The method as claimed in claim 1, wherein the method is used for packing objects by a multi-axis packaging machine, the multi-axis packaging machine being a picker.

11. A control device for controlling a pickup of a multi-axis handling device, the pickup being provided for picking up objects which are carried along by a conveyor device and/or for putting down objects already picked up which are to be put down onto the conveyor device,
    wherein the control device is linked to a drive of the multi-axis handling device for outputting setting coordinates for the pickup,
    wherein the control device is connected to devices for detecting distance and speed of the conveyor device or of the objects carried along on the conveyor device, and
    wherein the control device features a processor-assisted control unit for executing a path synchronization program module storing a method for synchronizing a pickup of a multi-axis handling device, the method comprising:
    synchronizing the pickup along a computationally-determined polynomial path of at least a 3rd order between a starting point and a destination point, wherein the polynomial path is a polynomial path of the 5th order;
    defining the polynomial path via the starting point, the destination point, via a respective tangent vector in the starting and destination point and via a respective curvature vector in the starting and destination point;
    allocating a direction pointing to the destination point to the starting point tangent vector during the synchronization of the pickup from a standstill; and
    allocating a null vector to the starting point curvature vector.

12. A non-transitory computer readable medium storing a path synchronization program module for carrying out a method for synchronizing a pickup of a multi-axis handling device on a control device for controlling the pickup, the method comprising:
    synchronizing the pickup along a computationally-determined polynomial path of at least a 3rd order between a starting point and a destination point, wherein the polynomial path is a polynomial path of the 5th order;
    defining the polynomial path via the starting point, the destination point, via a respective tangent vector in the starting and destination point and via a respective curvature vector in the starting and destination point;
    allocating a direction pointing to the destination point to the starting point tangent vector during the synchronization of the pickup from a standstill; and
    allocating a null vector to the starting point curvature vector.

13. The non-transitory computer readable medium as claimed in claim 12, the method further comprising:
    following the polynomial path via a speed profile with speed continuity.

14. The non-transitory computer readable medium as claimed in claim 12, the method further comprising:
    continuing a speed present in the starting point and to be expected in the destination point with continuity by the speed profile.

* * * * *